May 20, 1941. H. F. FLOWERS 2,242,856
BRAKING EQUIPMENT
Filed July 25, 1940 3 Sheets-Sheet 1
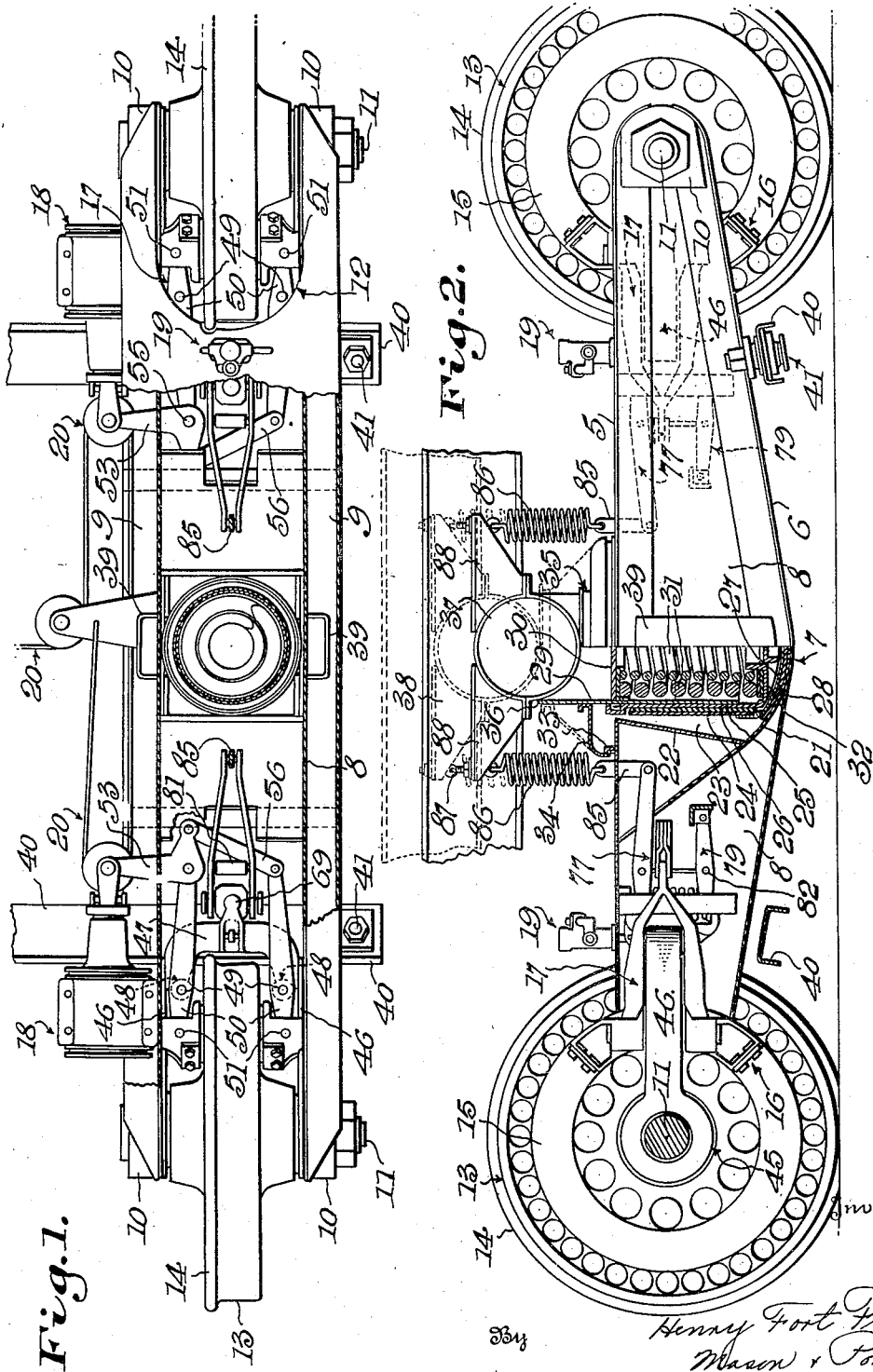

May 20, 1941. H. F. FLOWERS 2,242,856
BRAKING EQUIPMENT
Filed July 25, 1940 3 Sheets-Sheet 2

Inventor
Henry Fort Flowers
By Mason & Porter
Attorneys

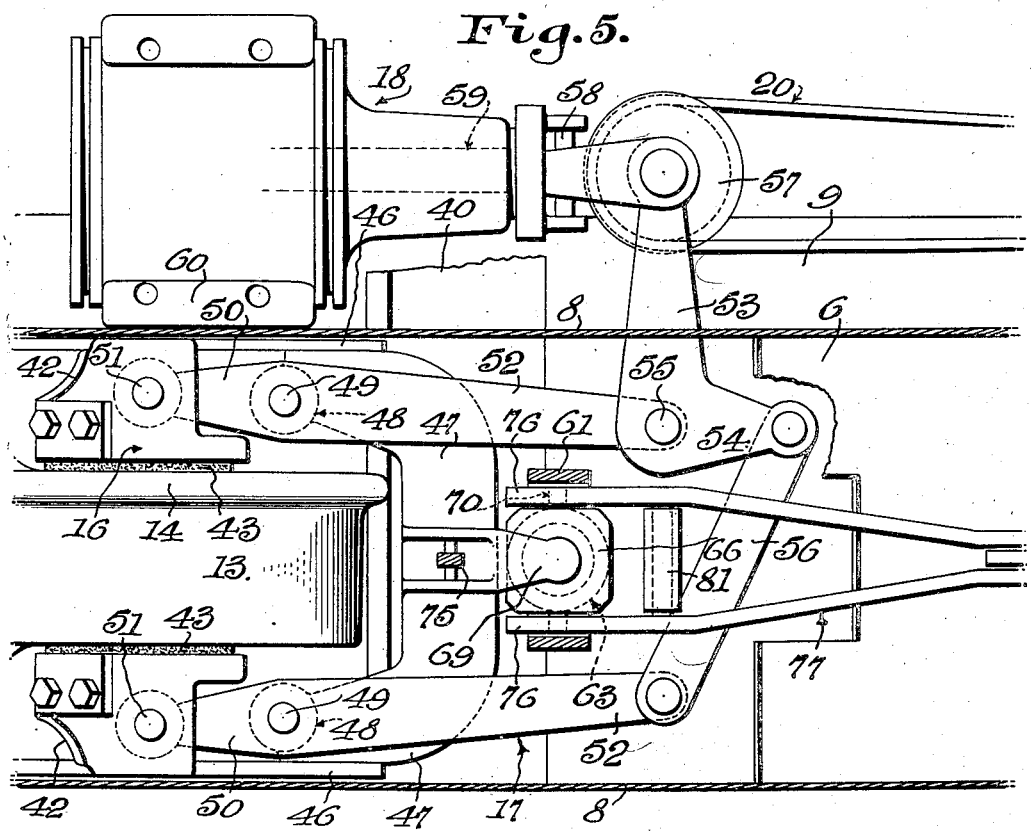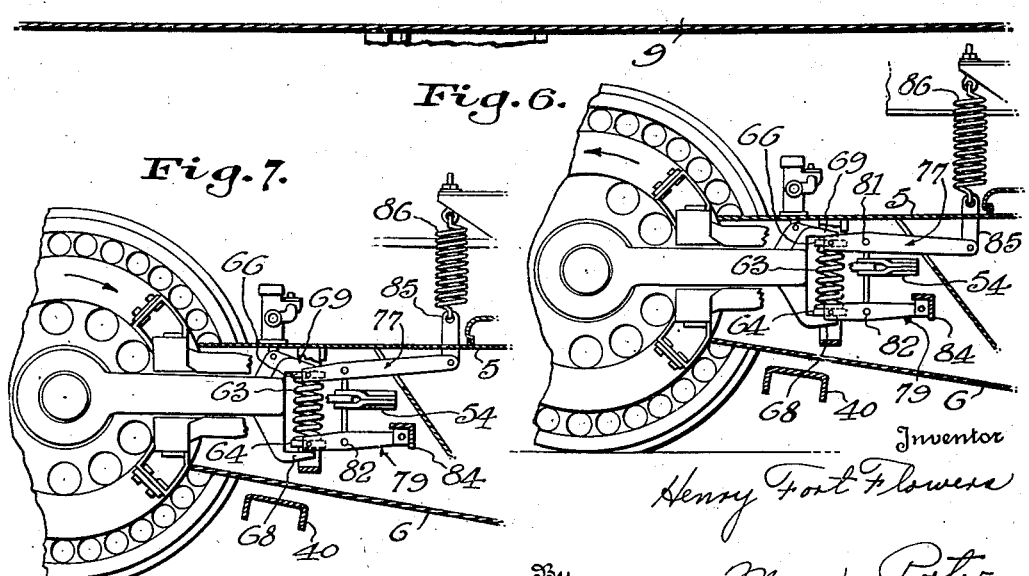

Patented May 20, 1941

2,242,856

UNITED STATES PATENT OFFICE 2,242,856

BRAKING EQUIPMENT

Henry Ford Flowers, Findlay, Ohio

Application July 25, 1940, Serial No. 347,522

20 Claims. (Cl. 303—22)

The invention relates generally to hydraulically actuated brakes and primarily seeks to provide novel means for automatically controlling the application of the brakes by the tendency of the brake shoes to rotate with the wheels in a manner for assuring against sliding of the wheels, and including means for varying the effect of said controlling means to permit application of a greater or lesser amount of braking effort accordingly as the load on the vehicle equipped with the braking equipment is increased or diminished.

More particularly, the invention seeks to provide new and useful improvements of the character stated in tandem wheel truck structures of the type disclosed in my co-pending application for Letters Patent Serial No. 274,849, filed May 20, 1939. In truck structures of the type stated, pairs of truck elements or units are independently pivoted to cross bolster structures and are tie bar connected so as to be maintained in substantially parallel relation. Each of these truck elements or units carries a pair of wheels disposed in tandem relation, and in providing braking equipments for wheels mounted in this fashion provision must be made for accommodating the independent movements of the individual truck elements without disrupting the braking connections or controls. It is also very desirable to increase the brake pressure on the leading wheel of a truck element as compared with that applied to the trailing wheel, because the reaction of the brake shoe against the frame tends to rotate the frame in the direction of travel of the wheel and thereby increases the weight on the leading wheel and correspondingly reduces the weight on the trailing wheel.

Therefore, an object of the invention is to provide a brake control means of the character stated which includes means for causing the braking pressure applied to the leading wheels of truck elements to be greater than that applied to the trailing wheels.

In its more detailed nature the invention seeks to provide a control equipment of the character stated wherein is included a fluid pressure control valve, a yoke structure shiftably mounted and carrying a brake shoe and being operatively connected with the valve so that movement imparted to the yoke structure due to tendency of the brake shoe to rotate with the wheel will be transmitted to the control valve for fluid pressure application controlling purposes, spring means for resisting movement of said yoke structure, and means for varying the resistance to movement offered by said spring accordingly as the load on the vehicle equipped with the braking equipment varies.

Another object of the invention is to provide a control equipment of the nature stated including a movement resisting spring means, and means for varying the resistance to movement offered by the spring means accordingly as the wheel with which a particular braking equipment is associated is rotating in one direction or the other.

Another object of the invention is to provide in a tandem wheel truck element of the character stated, yoke movement resisting spring means, and spring resistance altering means including long and short levers effective to so control the resistance offered by the spring means as to permit application of a greater amount of braking pressure to the leading wheel than to the trailing wheel.

With the above and other objects in view that will hereinafter appear, the nature of the invention will be more clearly understood by following the detailed description, the appended claims, and the several views illustrated in the accompanying drawings.

Figure 1 is a plan view of a tandem wheel truck unit embodying the invention, parts being broken away and shown in horizontal section.

Figure 2 is a side elevation and part vertical longitudinal section of the unit shown in Figure 1, a raised bolster condition representing a light load or a reduced load at one side due to turning of the vehicle being indicated in dot and dash lines.

Figure 5 is an enlarged fragmentary plan view illustrating one of the brake control equipments, parts being broken away and shown in horizontal cross-section.

Figures 6 and 7 are diagrammatic views illustrating the spring resistance altering levers moved as by application of the brake shoes to forwardly and rearwardly rotating wheels respectively.

Figure 3:
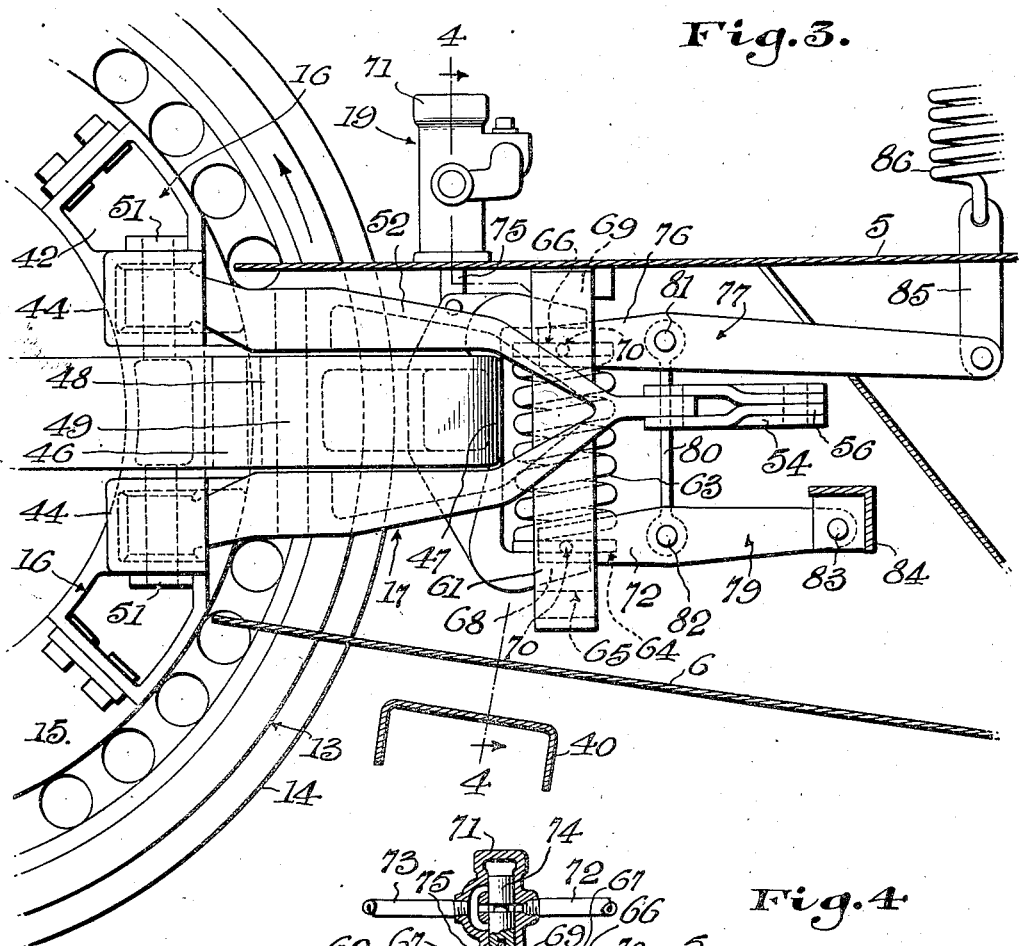
Figure 3 is an enlarged fragmentary vertical longitudinal section of one end of the truck unit, the brake control equipment being shown in side elevation.

In the example of embodiment of the invention herein disclosed, the invention is illustrated as embodied in a truck element including horizontally disposed upper plating 5 and opposed lower plating 6 spaced from the upper plating and having a lower central point 7 and converging upwardly in the fore and aft direction toward said upper plating. The sides of the truck element are closed by suitably spaced side plating 8, and the side and top and bottom plating is suitably reinforced by angle plates 9 welded to said plating.

Bearing boxes 10 are secured in spaced relation at each end of each truck element, and each pair of such boxes serves to support a stub axle 11 on which a wheel is rotatably mounted. Each wheel is accommodated in bifurcations 12 in the plating 5 and 6 and includes a tread surface 13, the usual flange 14 and laterally disposed brake ring portions 15.

The brake ring portions 15 are opposed by arcuate brake shoes 16 controlled by suitable actuator devices generally designated 17 and to which movement can be applied by application of fluid pressure through the brake cylinder equipments generally designated 18, under automatic torque control, through the medium of pressure control devices generally designated 19, or manually through suitable tackle generally designated 20.

Each truck element also includes central cradle plating 21 and well plating 22 spaced in the fore and aft direction with respect to the geometrical vertical center of the truck element and tilted up and inwardly in a manner for forming a gimbal well 23.

The well 23 accommodates the positioning of a gimbal structure composed of an outer shell or sleeve 24 and an inner shell or sleeve 25 concentric with and spaced a considerable distance inwardly of the outer sleeve. The sleeves 24 and 25 are separated by a live rubber cushion or sleeve 26 which is interposed between and vulcanized to said sleeves. This rubber sleeve allows the inner sleeve 25 to partake of a considerable amount of vertical and lateral movement within the outer sleeve 24.

The outer sleeve structure 24 also includes a bottom plate 27 which rests upon a rubber mat 28 interposed between the plate 28 and the cradle plating 21. A king post sleeve 29 is telescopically mounted in the inner sleeve 25 and extends upwardly through the well 23 and includes an abutment partition 30. An equipment of nested compression springs 31 may be interposed between the partition and the bottom member 32 of the inner gimbal sleeve 25.

An annular grooved mounting ring 33 is carried by each truck element top plating 5 in position for surrounding the respective king post well 23, and this ring is encircled by a flexible dust guard 34 which grips the king post sleeve 29 as at 35. The king post sleeves 29 of each complementary pair of truck elements or units are secured as at 36 to a cross bolster 37 which may comprise a cylindrical body formed of flange-secured half portions. The cross bolsters serve to secure complementary pairs of truck elements in generally parallel spaced relation and the bolsters of each car are secured in longitudinally spaced relation by a suitable center beam structure 38 which is mounted upon and secured in any approved manner to the bolsters in the manner illustrated in Figure 2 of the drawings.

If desired, each truck element may be reinforced at each side of its king post equipment by suitable vertically disposed gusset elements 39.

A tie bar is connected across the truck elements toward the end of each complementary pair thereof. Each tie bar preferably comprises an inverted channel member 40 which is pivotally connected as at 41 to each truck element of a complementary pair of truck elements at a point outside the track gage line in the manner illustrated in Figures 1 and 2 of the drawings. The tie bar members thus connected across between the truck elements cause said elements to move in unison.

Each brake shoe 16 includes an arcuate body 42 having a fabric or composition braking material pad 43 affixed thereto. Each brake shoe also includes a pair of vertically spaced and aligned actuator arm end mounting eyes 44.

Pivotally mounted about each stub axle 11 as at 45, and straddling the respective wheel, is a U-shaped yoke member including side arms 46 and a base or cross arm 47. Each side arm 46 is equipped with a vertically disposed bearing portion 48 carrying a bearing pin 49. Each pin projects upwardly and downwardly beyond the bearing portion in which it is mounted and provides pivotal support for a U-shaped actuator member formed to present short brake shoe carrying arms 50 which are pivotally secured as at 51 to the mounting eyes 44 of the brake shoes, and a relatively long actuator arm portion 52 shaped to straddle the yoke portions 46 and 47.

By reference to Figures 1 and 5 of the drawings, it will be obvious that as the free ends of each cooperating pair of the actuator arms 52 are moved toward each other they will force the associated brake shoes away from the wheel disposed between them, whereas when said arm ends are moved in the opposite direction or separated, the brake shoes will be applied to said wheel.

In order to impart the necessary movements to the actuator arms 52 for applying and releasing the brakes, the inner arm of each associated pair has mounted thereon a bell crank lever having a long arm 53 and a short arm 54, said lever being pivoted to the free end of the actuator arm as at 55. The short arm 54 is link-connected as at 56 to the free end of the other actuator arm 52, and the free end of the long arm 53 carries a pulley 57 and is connected as at 58 with the piston rod 59 of a brake cylinder 18 supported as at 60 on the truck unit frame and to which fluid pressure is applied in a manner soon to be described. See Figures 1 and 5.

By reason of the fact that the brake shoe supporting and actuating arm structures 50, 52 are pivotally supported as at 51 on the yoke structure, 46, 47, as the brake shoes 16 are applied to the wheel sides they will tend to move around with the wheel, in either direction of travel thereof, and this movement will be transmitted to the particular yoke structure 46, 47, causing it to swing about the axis of the wheel. This torque effect is utilized to control the application of fluid pressure in the fluid pressure actuation of the braking devices so as to avoid locking of the brakes and sliding of the wheels.

An open frame or bracket 61 is secured at 62 to each truck unit frame structure adjacent each particular yoke base 47, and a compression or movement resisting spring 63 is positioned in each bracket 61 with its lower end abutting an abutment plate 64 opposed by fixed stops 65, and its upper end abutting an abutment plate 66 opposed by fixed stops 67. Each spring 63 is opposed at its lower end by a lug 68 projecting from the bottom of the respective yoke base, and at the top by a similar lug 69 projecting from the upper portion of the particular yoke base. Each abutment plate 64 or 66 is pivotally mounted by trunnions 70 at one end of a control lever later to be described so that each said plate can engage flatly with the respective spring end regardless of the positions of said levers. Each spring 63 thus resists upward or downward swinging motion of the particular yoke 46, 47 under the torque or urge imparted by the applied brake shoe 16.

Figure 4:
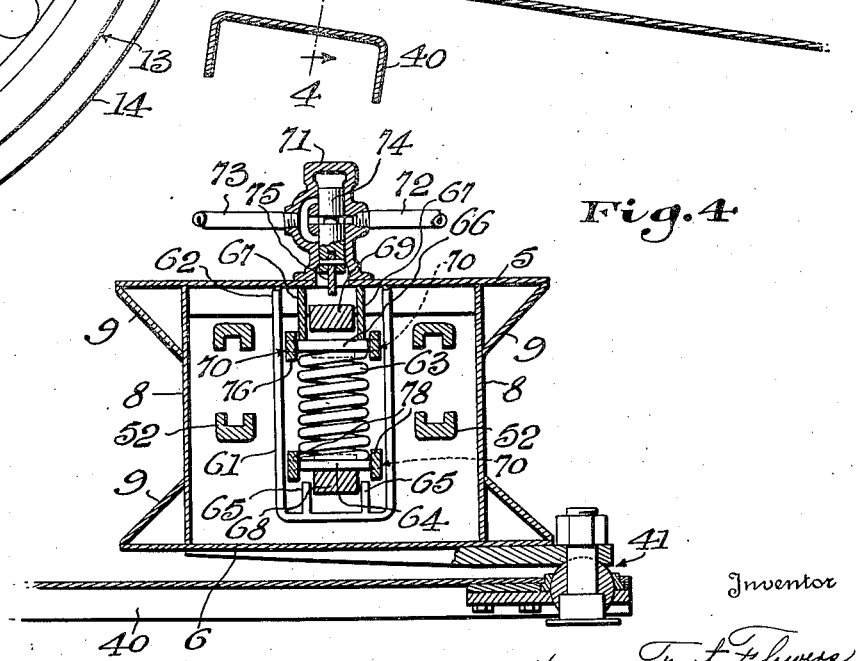
Figure 4 is a fragmentary vertical cross section taken on the line 4—4 on Figure 3.

Each of the pressure control devices hereinbefore generally designated 19 includes a valve structure 71 supported upon the truck framing directly above each yoke cross arm 47 in the manner illustrated in Figures 1, 3 and 4 of the drawings. Each control valve is connected by a pipe line 72 with the auxiliary reservoir or other source of pressure fluid supply (not shown), and by a pipe line 73 with the associated brake cylinder 18. The valve element or plunger 74 reciprocably mounted in each valve casing is link-connected as at 75 with the respective yoke cross arm 47, and it will be obvious that as the yoke moves upwardly or downwardly with the applied brake shoes 16 movement will be imparted to the valve elements for the purpose of slacking off or relieving brake pressure whenever the predetermined maximum of brake pressure has been attained in order to prevent sliding of the wheels. The specific construction and operation of these pressure controlling equipments is more fully disclosed in my co-pending application for letters-patent hereinbefore referred to.

Describing the operation of the mechanism thus far referred to, when a vehicle is traveling over the trackway and it is desired to apply the brakes, the engineer or operator reduces the pressure in the train line in the usual manner, and since all of the control valve portings are normally open, see Figure 4, the control valves will have no effect on normal operations of the braking equipments. The fluid pressure applied in the respective brake cylinders 18 will act through the bell crank lever and link connections 52, 54, 56 to move the free ends of the actuator arms 52 apart and effect an application of the brake shoes 16.

So long as the braking effort is less than a predetermined maximum such as would cause the wheels to lock and slide on the rails, which maximum is determined by the resistance of the spring equipments 63, the control valves 71 will have no effect on the braking operations.

Should an objectionable braking effort be applied to the wheels, or any particular wheel, such as would cause sliding of said wheel or wheels, the brake shoes 16 tending to turn with the wheel or wheels would swing the yoke equipments 46, 47 and overcome the resistance of the spring equipments 63 so as to lift or lower the valve elements 74 by actuation of the connection links 75, according to the direction of rotation of said wheel or wheels. A moderately excessive application of braking effort would move the valve element in one direction or the other to a lap position and completely cut off the fluid pressure application. A more excessive braking effort against wheels turning in one direction or the other would move the valve elements to not only cut off the application of fluid pressure but also to permit the pressure fluid from the brake cylinders to exhaust through the exhaust porting and thereby release the brakes in the manner clearly disclosed in the co-pending application for Letters-Patent hereinbefore referred to.

Among the outstanding objects of the present invention are those of controlling the resistance to movement imposed upon the yoke structures so as to enable application of a greater amount of braking pressure to a given wheel accordingly as it is traveling in one direction or another, or, in other words, to enable application of a greater amount of braking pressure to a leading wheel than to a trailing wheel, and also to enable application of a greater or lesser amount of braking pressure accordingly as the load imposed upon the vehicle equipped with my improved braking apparatus is increased or diminished. The mechanisms for effecting these controls will now be described.

The upper abutment plate 66 of the braking equipment associated with each wheel is pivotally mounted at 70 between the spread arms 76 of a long lever 77, and the lower abutment plate 64 is pivotally mounted at 70 between the spread arms 78 of a short lever 79. These levers are disposed in generally horizontal and generally parallel relation as illustrated in Figure 3 of the drawings, and it will be noted by reference to Figures 3 and 4 of the drawings that the spread arms 78 normally rest on stops 65 carried by the frame bracket 61 and which limit downward movement of the lever 79. Upward movement of the long lever 77 is, of course, limited by the upper fixed stops 67 hereinbefore referred to.

The levers 77 and 79 of each set are link-connected by a vertical link 80 which is pivoted as at 81 to the upper or long lever and as at 82 to the lower or short lever. Each short lever is pivoted as at 83 to a fixed cross bar 84, and the long free end of each long lever 77 is link-connected as at 85 to the lower end of a tension spring 86 adjustably anchored as at 87 to a bracket 88 extending from the bolster 37.

Each tension spring 86 acts through its connected levers 77 and 79 to impose pressure at the opposite ends of the compression spring 63 by engagement of the lever-carried abutment plates 64 and 66 therewith. Thus each tension spring 86 serves to pre-load or diminish the potential resistance to yoke movement of the associated spring 63.

It will be obvious that the greater the resistance offered to movement of a given yoke the more braking pressure can be applied to the associated wheel before that braking pressure will be slacked off or relieved by functioning of the associated automatic fluid pressure control 19. It will be evident, therefore, that as the tension of a given spring 86 is relaxed the degree of pre-loading of the associated compression spring 63 will be diminished and the amount of pressure that can be applied to the associated wheel without automatically relieving said pressure by the control stated will be correspondingly increased. It will be obvious also, by reference to Figure 2 of the drawings, that as the load on the bolster 37 is increased the king post 29 will be depressed and the brackets 88 moved downwardly, and that this downward movement of the brackets 88 will relax tension of the springs 86. Correspondingly, when the vehicle load is reduced the king posts 29 move upwardly and the tension of the springs 86 is increased. (See dot and dash lines on Figure 2.) Thus the resistance value of the compression springs 63 will be increased or diminished accordingly as the load imposed upon the truck unit is diminished or increased. The values of the springs 86 can be adjusted by means of the screw equipments 87.

As has been previously stated, it is desirable to be able to apply a greater braking pressure to a leading wheel on the truck unit than to a trailing wheel. Assuming that the truck unit illustrated in Figure 2 is traveling toward the left (see Figure 6), application of the brake shoes to the wheel will cause the yoke structure associated with the left or leading wheel to move upwardly, whereas the yoke structure associated with the right or trailing wheel will tend to move downwardly. The control unit associated with the left or leading wheel is illustrated in greater detail in Figure 3 from which it will be observed that upward movement of the yoke cross arm 47 will cause the lower lug 66 to lift the abutment plate 64 and the free end of the lower or short lever 79. Upward movement of the lower lever will be transmitted to the upper or long lever 77 through the link 80, and since the short end of the long lever 69 is held against upward movement by the stops 67, the long lever will be caused to fulcrum about these stops and impart an upward movement to the link 85 serving to relax the particular tension spring 86 to the extent of said upward movement. This relaxation of the spring 86 serves to alter (increase) the resistance to movement set up by the compression spring 63 and to increase to a definite degree the predetermined maximum of braking effort which can be applied before a slacking off of the brake shoes applied to said leading wheel.

Since the positioning of the control equipment associated with the trailing wheel is reversed with respect to the equipment just described, the downward movement applied to the yoke cross arm associated with the trailing wheel will serve to depress the upper abutment plate 66 and the engaging end of the upper long lever 77. However, since the associated lower or short lever 79 is held against downward movement by its fixed pivot 83 and the supporting lugs 65, the lever pivot 81 becomes fixed and the upward swinging movement imparted to the associated link 85 will be somewhat greater than the movement applied to the corresponding link associated with said leading wheel. Thus the associated tension spring 86 will be relaxed to a greater degree that in the case of the leading wheel and consequently the resistance to movement in the associated compression spring 63 will be less than that in the compression spring associated with said leading wheel, and the amount of braking pressure that can be applied to the trailing wheel prior to automatic slacking off of the braking pressure will be less than that which can be applied to said leading wheel.

Thus the tension spring and the lever equipments automatically vary the predetermined maximum at which the brake pressures are relieved in order to avoid sliding of the wheels accordingly as a given wheel is turning in one direction or the other so as to enable the application of a greater amount of braking pressure to a leading wheel than to a trailing wheel.

In Figure 2 of the drawings the bolster 37 is shown raised in dot and dash lines to indicate a light load condition in the vehicle or a lifting of the bolster due to the shifting of weight from one side of the car to the other as when travelling around a curve at high speeds. In either case the reduced weight increases the tension on the springs 86. This increased tension on the springs 86 reduces the amount of braking torque necessary to cut off air application to the braking equipments. Therefore, by proper selection of springs 86, the maximum allowable pressure or torque of the brakes will be reduced in proportion to the reduction of weight on the rails.

The positions of the levers 77 and 79 as shown in Figures 6 and 7 are at the point of cut-off or lap which stops the flow of brake fluid into the pressure cylinder 18 to limit the maximum pressure of the brake shoes against the wheels. When the brakes are applied at high speed, the pressure of the brake shoes against the wheels may be approximately five times the pressure of the wheels against the rails without causing wheel sliding. As the speed of travel is reduced, the coefficient of adhesion between the brake shoes and the wheels increases and this in turn increases the braking torque and compresses the respective spring 63 sufficiently to exhaust fluid from the brake cylinder gradually as the coefficient of adhesion increases.

It will be observed by reference to Figure 6 of the drawings that the spring 86 which governs the leading wheel acts through levers 77 and 79 at a reduced ratio and with less tendency to assist the compression of the respective spring 63 than in the case of the spring 86 acting on the braking equipment of the trailing wheel. See Figure 7. Therefore, it requires increased brake shoe pressure or braking torque on the leading wheel to compress the respective spring 63 sufficiently to cut off the brake fluid over and above that required to cut off the fluid pressure on the trailing wheel.

It should be noted also that the weight of the braking parts must be overcome by the brake shoe friction or braking torque before there is any tendency to compress the spring 63 adjacent the leading wheel whereas the reverse is true of the trailing braking equipment. Thus it may be seen that it is a combination of the weight of the parts and the length of the levers 77 and 79 that produces additional braking effect on the leading wheel and reduced braking effect on the trailing wheel in proportion to the increased pressure of the leading wheel on the rail and the reduced pressure of the trailing wheel on the rail resulting from the braking torque reacting on the truck frame.

By proper selection of springs 86, levers 77 and 79, and the size of the springs 63 and weight of the braking parts, the maximum brake pressure on both wheels is limited by the extension of the spring equipment 31 (reduced weight of the vehicle on the truck frame), and at the same time correct transfer of weight due to braking torque is attained which will result in maximum braking effect without tendency of slipping the wheels, graduated as required from very high speed to full stop at a maximum uniform rate of deceleration without slipping the wheels.

It is of course to be understood that the details of structure and arrangement of parts may be variously changed and modified without departing from the spirit and scope of my invention.

I claim:

1. In a wheeled truck unit, brake means, fluid pressure operated means for actuating the brake means and including a normally open valve through which pressure fluid may flow freely to control all normal braking functions, means for automatically effecting a partial closure of said valve and relieving applied brake pressure upon attainment of a predetermined maximum of braking pressure to avoid sliding of wheels, spring means for determining said predetermined maximum, and spring means for automatically varying said predetermined maximum accordingly as the load on said truck unit varies.

2. In a truck unit supported upon a plurality of wheels, a fluid pressure actuated brake means associated with each wheel, each said brake means including means for automatically relieving brake pressure applied to the respective wheel upon attainment of a predetermined maximum so as to avoid sliding of said wheel, spring means for determining said predetermined maximum, and means including tension spring means and pivoted levers cooperatively engaging said spring means and said tension spring means and effective for automatically varying said predetermined maximum accordingly as said wheel is turning in one direction or the other.

3. In a truck unit supported upon a plurality of wheels, a fluid pressure actuated brake means associated with each wheel, each said brake means including means for automatically relieving brake pressure applied to the respective wheel upon attainment of a predetermined maximum so as to avoid sliding of said wheel, means for automatically varying said predetermined maximum accordingly as said wheel is turning in one direction or the other, and means for automatically varying said predetermined maximum accordingly as the load on said truck unit varies.

4. In a tandem wheel truck unit, a supporting wheel at each end of said unit, a fluid pressure actuated brake means associated with each wheel, each said brake means including means for automatically relieving brake pressure applied to the respective wheel upon attainment of a predetermined maximum so as to avoid sliding of said wheel, and means for automatically varying said predetermined maximum with respect to each brake means accordingly as the associated wheel is travelling in one direction or the other so that the predetermined maximum with respect to the leading wheel will always exceed that with respect to the trailing wheel.

5. In a tandem wheel truck unit, a supporting wheel at each end of said unit, a fluid pressure actuated brake means associated with each wheel, each said brake means including means for automatically relieving brake pressure applied to the respective wheel upon attainment of a predetermined maximum so as to avoid sliding of said wheel, means for automatically varying said predetermined maximum with respect to each brake means accordingly as the associated wheel is travelling in one direction or the other so that the predetermined maximum with respect to the leading wheel will always exceed that with respect to the trailing wheel, and means for automatically varying said predetermined maximum accordingly as the load on said truck unit varies.

6. In a wheeled vehicle, a truck frame, a brake shoe equipment engageable with and disengageable from a wheel, fluid pressure actuated means for imparting movement to said brake shoe equipment, a normally open valve for controlling the flow of pressure fluid to said pressure actuated means, means directly connected with said valve and supporting said brake shoe equipment and movable with said shoe equipment under braking action urge for closing said valve as the braking force exceeds a predetermined maximum, spring means determining said predetermined maximum, and means for automatically altering the value of said spring means as the load on the vehicle varies so that the predetermined maximum will be increased as the load is increased and diminished as the load is diminished.

7. In a tandem wheel truck unit, a supporting wheel at each end of said unit, a brake shoe equipment engageable with and disengageable from each wheel, fluid pressure actuated means for actuating each brake shoe equipment and including, a normally open valve for controlling the flow of pressure fluid to said pressure actuated means, means directly connected with said valve and supporting said brake shoe equipment and movable with said shoe equipment under braking action urge for closing said valve as the braking force exceeds a predetermined maximum, spring means determining said predetermined maximum, and means for automatically altering the value of said spring means accordingly as the associated wheel is rotated in one direction or the other in a manner for causing the predetermined maximum with respect to a leading wheel always to exceed the predetermined maximum with respect to the trailing wheel.

8. In a tandem wheel truck unit, a supporting wheel at each end of said unit, a brake shoe equipment engageable with and disengageable from each wheel, fluid pressure actuated means for actuating each brake shoe equipment and including, a normally open valve for controlling the flow of pressure fluid to said pressure actuated means, means directly connected with said valve and supporting said brake shoe equipment and movable with said shoe equipment under braking action urge for closing said valve as the braking force exceeds a predetermined maximum, spring means determining said predetermined maximum, means for automatically altering the value of said spring means accordingly as the associated wheel is rotated in one direction or the other in a manner for causing the predetermined maximum with respect to a leading wheel always to exceed the predetermined maximum with respect to the trailing wheel, and means for automatically altering the value of said spring means as the load on the vehicle varies so that the predetermined maximum will be increased as the load is increased and diminished as the load is diminished.

9. In a tandem wheel truck unit, a supporting wheel at each end of said unit, a brake shoe equipment engageable with and disengageable from each wheel, fluid pressure actuated means for actuating each brake shoe equipment and including, a normally open valve for controlling the flow of pressure fluid to said pressure actuated means, means directly connected with said valve and supporting said brake shoe equipment and movable with said shoe equipment under braking action urge for closing said valve as the braking force exceeds a predetermined maximum, spring means determining said predetermined maximum, means for automatically altering the value of said spring means accordingly as the associated wheel is rotated in one direction or the other in a manner for causing the predetermined maximum with respect to a leading wheel always to exceed the predetermined maximum with respect to the trailing wheel, and means for manually adjusting each said spring means.

10. In a tandem wheel truck unit, a supporting wheel at each end of said unit, a brake shoe equipment engageable with and disengageable from each wheel, fluid pressure actuated means for actuating each brake shoe equipment and including, a normally open valve for controlling the flow of pressure fluid to said pressure actuated means, means directly connected with said valve and supporting said brake shoe equipment and movable with said shoe equipment under braking action urge for closing said valve as the braking force exceeds a predetermined maximum, spring means determining said predetermined maximum, means for automatically altering the value of said spring means accordingly as the associated wheel is rotated in one direction or the other in a manner for causing the predetermined maximum with respect to a leading wheel always to exceed the predetermined maximum with respect to the trailing wheel, means for automatically altering the value of said spring means as the load on the vehicle varies so that the predetermined maximum will be increased as the load is increased and diminished as the load is diminished, and means for manually adjusting each said spring means.

11. In a vehicle of the character described, the combination with a wheel and its mounting frame, of a yoke movably mounted and straddling a flange of the wheel, a brake shoe supported on said yoke at each side of said wheel, yieldable means resisting movement of said yoke under braking action urge, fluid pressure actuated means for moving the brake shoes against the wheel including a normally open pressure controlling valve, means connecting said yoke with the valve whereby when said yoke moves a predetermined distance it will close said valve and cut off pressure application, and means for diminishing the movement resisting value of said yieldable means accordingly as the load on the vehicle is increased.

12. In a braking mechanism of the character described, the combination with a wheel and its mounting frame, of a yoke movably mounted and straddling a flange of the wheel, a brake shoe supported on said yoke at each side of said wheel, yieldable means resisting movement of said yoke under braking action urge, fluid pressure actuated means for moving the brake shoes against the wheel including a normally open pressure controlling valve, means connecting said yoke with the valve whereby when said yoke moves a predetermined distance it will close said valve and cut off pressure application, and means for altering the movement resisting value of said yieldable means in a greater or lesser degree accordingly as the wheel is travelling in one direction or the other.

13. In a vehicle of the character described, the combination with a wheel and its mounting frame, of a yoke movably mounted and straddling a flange of the wheel, a brake shoe supported on said yoke at each side of said wheel, a compression spring supported on said frame and engaged above and below by said yoke for resisting movement of said yoke under braking action urge, fluid pressure actuated means for moving the brake shoes against the wheel including a normally open pressure controlling valve, means connecting said yoke with the valve whereby when said yoke moves a predetermined distance it will close said valve and cut off pressure application, means including a tension spring normally effective to diminish the potential resistance to movement exerted by said compression spring, and means for progressively reducing tension in said tension spring as the load on the vehicle is increased.

14. In a vehicle of the character described, the combination with a wheel and its mounting frame, of a yoke movably mounted and straddling a flange of the wheel, a brake shoe supported on said yoke at each side of said wheel, a compression spring supported on said frame and engaged above and below by said yoke for resisting movement of said yoke under braking action urge, fluid pressure actuated means for moving the brake shoes against the wheel including a normally open pressure controlling valve, means connecting said yoke with the valve whereby when said yoke moves a predetermined distance it will close said valve and cut off pressure application, means including a tension spring normally effective to diminish the potential resistance to movement exerted by said compression spring, means for progressively reducing tension in said tension spring as the load on the vehicle is increased, and means for reducing the tension in said tension spring in a greater or lesser degree accordingly as the wheel is travelling in one direction or the other.

15. In a vehicle of the character described, the combination with a wheel and its mounting frame, of a yoke movably mounted and straddling a flange of the wheel, a brake shoe supported on said yoke at each side of said wheel, a compression spring supported on said frame and engaged above and below by said yoke for resisting movement of said yoke under braking action urge, fluid pressure actuated means for moving the brake shoes against the wheel including a normally open pressure controlling valve, means connecting said yoke with the valve whereby when said yoke moves a predetermined distance it will close said valve and cut off pressure application, means including a tension spring normally effective to diminish the potential resistance to movement exerted by said compression spring, and means for reducing the tension in said tension spring in a greater or lesser degree accordingly as the wheel is travelling in one direction or the other.

16. In a vehicle of the character described, the combination with a wheel and its mounting frame, of a yoke movably mounted and straddling a flange of the wheel, a brake shoe supported on said yoke at each side of said wheel, a compression spring supported on said frame and engaged above and below by said yoke for resisting movement of said yoke under braking action urge, fluid pressure actuated means for moving the brake shoes against the wheel including a normally open pressure controlling valve, means connecting said yoke with the valve whereby when said yoke moves a predetermined distance it will close said valve and cut off pressure application, means including a tension spring normally effective to diminish the potential resistance to movement exerted by said compression spring, and means for reducing the tension in said tension spring in a greater or lesser degree accordingly as the wheel is travelling in one direction or the other, said last named means including a pivotally mounted long lever, a pivotally mounted short lever, said levers opposing the respective ends of the compression spring and being engaged by and movable with said yoke, and means connecting the tension spring with said levers so that it constantly tends to engage said levers with and compress said compression spring.

17. In a tandem wheel truck unit, a supporting wheel at each end of said unit; a yoke movably mounted and straddling a flange of each wheel, said yokes being disposed between the wheels; a braking equipment associated with each wheel and including a brake shoe supported on the respective yoke and engageable with the respective wheel, a compression spring supported on the truck unit and opposed above and below by said yoke for resisting movement of said yoke under braking action urge, fluid pressure actuated means for moving the brake shoe against the wheel including a normally open pressure controlling valve, means connecting said yoke and valve whereby when said yoke moves a predetermined distance it will close said valve and cut off pressure application, a pivotally mounted long lever, a pivotally mounted short lever, said levers opposing the respective ends of the compression spring and being engaged by and movable with said yoke for imparting a greater or lesser movement to one said lever accordingly as the yoke moves in one direction or the other, and a tension spring connected to said levers and normally effective to force the levers against the compression spring ends and partially overcome the movement resisting value of said compression spring but subject to being relaxed to a greater or lesser extent accordingly as the yoke moves the levers in one direction or another.

18. In a tandem wheel truck unit including braking equipments of the character defined in claim 16, means for partially relaxing both tension springs progressively as the load imposed upon the truck unit is increased.

19. In a tandem wheel truck unit including braking equipments of the character defined in claim 16, means for partially relaxing both tension springs progressively as the load imposed upon the truck unit is increased, said means including a load supporting bolster, means yieldably supporting the bolster so that it will move downwardly as the load on the bolster is increased, and means forming anchorage for said tension springs and from which they are suspended in vertical position.

20. In a tandem wheel truck unit, a supporting wheel at each end of said unit, a brake shoe equipment engageable with and disengageable from each wheel, fluid pressure actuated means for actuating each brake shoe equipment and including, a normally open valve for controlling the flow of pressure fluid to said pressure actuated means, means directly connected with said valve and supporting said brake shoe equipment and movable with said shoe equipment under braking action urge for closing said valve as the braking force exceeds a predetermined maximum, compression spring means for determining said predetermined maximum, and automatically operable means for preloading said spring means to a greater or lesser degree accordingly as the load on said truck unit decreases or increases.

HENRY FORT FLOWERS.